United States Patent
Helmer et al.

(10) Patent No.: US 6,871,548 B2
(45) Date of Patent: Mar. 29, 2005

(54) HIGH PRECISION APPARATUS FOR IMPOSING OR MEASURING A POSITION OR A FORCE

(75) Inventors: Patrick Helmer, Denges (CH); Yann Mabillard, Ayent (CH); Reymond Clavel, Oulens/Echallens (CH); Stefano Bottinelli, Coldrerio (CH)

(73) Assignees: Sysmelec SA, Gals (CH); Mecartex SA, Losone (CH)

( * ) Notice: Subject to any disclaimer, the term of this patent is extended or adjusted under 35 U.S.C. 154(b) by 6 days.

(21) Appl. No.: 10/669,708

(22) Filed: Sep. 25, 2003

(65) Prior Publication Data

US 2004/0255696 A1 Dec. 23, 2004

(30) Foreign Application Priority Data

Sep. 27, 2002 (EP) .............................. 02079069

(51) Int. Cl.⁷ ................................. G01B 7/16
(52) U.S. Cl. ........................................ 73/781
(58) Field of Search ........................ 73/774, 781, 782

(56) References Cited

U.S. PATENT DOCUMENTS

| 4,042,051 A | 8/1977 | Ricciardi |
| 5,029,398 A | 7/1991 | Ertl |
| 5,419,669 A * | 5/1995 | Kremer et al. ................. 414/10 |
| 5,656,905 A * | 8/1997 | Tsai ........................ 318/568.21 |
| 6,688,183 B2 * | 2/2004 | Awtar et al. .................. 73/782 |

FOREIGN PATENT DOCUMENTS

| EP | 937 961 A2 | 8/1999 |
| EP | 1 113 191 A2 | 7/2001 |
| WO | WO 02 16092 A1 | 2/2002 |

OTHER PUBLICATIONS

Patent Abstracts of Japan, vol. 017, No. 206, Apr. 22, 1993 & JP 04 348834 (Yaskawa Electric Corp.), Dec. 3, 1992.
Patent Abstracts of Japan, vol. 2002, No. 04, Aug. 4, 2002 & JP 2001 349323, Dec. 21, 2001.

* cited by examiner

*Primary Examiner*—Max Noori
(74) *Attorney, Agent, or Firm*—Sughrue Mion, PLLC

(57) ABSTRACT

High precision apparatus is described which can be arranged and used in the form of manipulators, actuators, position transducers or force transducers, having four to six degrees of freedom. A movable platform (2), to which the object (3) subjected to movements or forces is fixed, is connected to a base (1) of the apparatus by six links in parallel. These links comprise articulated kinematic units (11–16) each comprising a deformable parallelogram and an articulated transmission device connecting the parallelogram to the platform (2). The parallelogram is associated with a position sensor and an electromagnetic transducer, such as a linear motor.

19 Claims, 12 Drawing Sheets

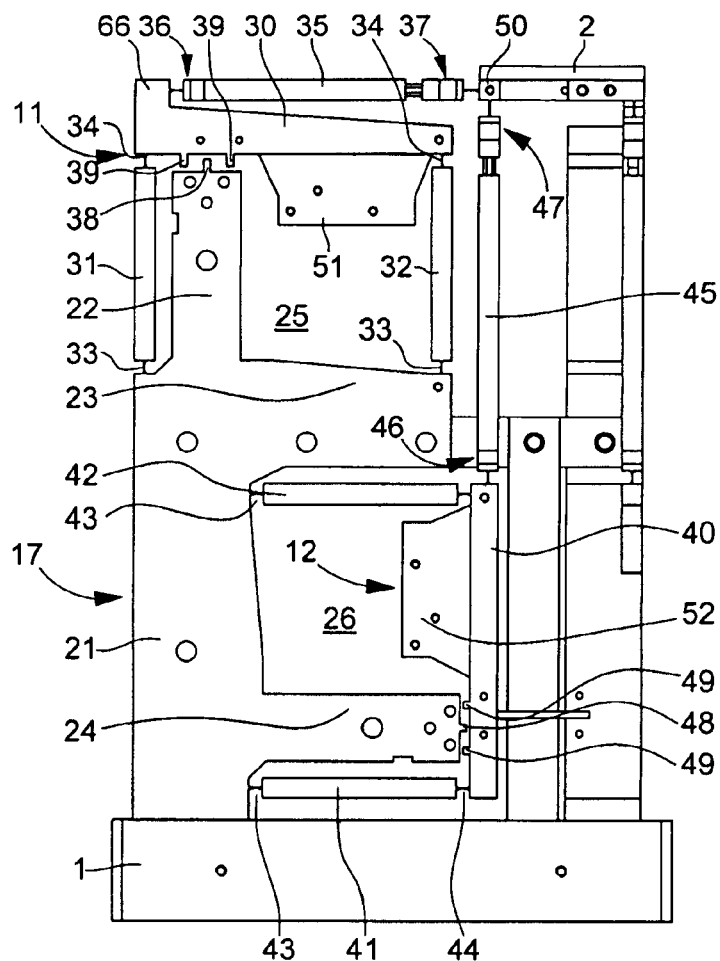
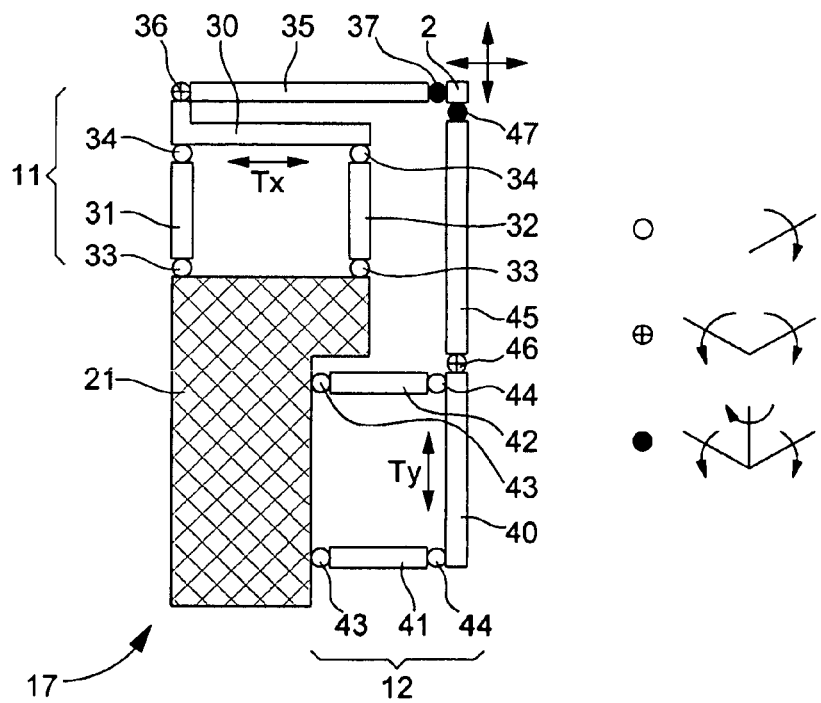
Fig. 8
Fig. 9

HIGH PRECISION APPARATUS FOR IMPOSING OR MEASURING A POSITION OR A FORCE

The present invention concerns apparatuses for imposing or measuring a position or a force, with at least four degrees of freedom, comprising a fixed base, a movable platform, articulated links connecting the movable platform in parallel to the base, and measuring means, said articulated links comprising at least four articulated kinematic units, each of which is mounted on the base and connected to a point of connection of the platform to move in conjunction with a movement in translation of this point in a direction substantially parallel to one of the principal axes (X, Y, Z) of a spatial reference system, at least one pair of said kinematic units being connected to two of the said points of connection spaced from one another and arranged to move in conjunction with translations thereof in the same direction and thus to a rotation of the platform when the amplitudes of the translations at these two points are unequal.

The terms "impose or measure a position or a force" means that the invention is applicable to four types of apparatus according to the possible combinations of these terms, namely:

a) a manipulator when the function consists in imposing position by displacement of the platform;

b) an actuator when the function consists in imposing one or more forces on the platform, with or without displacement thereof;

c) a position sensor, otherwise called a feeler, when the function consists in measuring the position of the platform; and d) a force sensor when the function consists in measuring one or more forces acting on the platform.

Obviously some of these functions can be combined in the same apparatus.

One such apparatus is used for example to manipulate objects with high precision and with a number of degrees of freedom going up to six, if each of the articulated kinematic units is equipped with a linear actuator and a displacement sensor to allow the amplitude of its translation to be regulated with the desired precision. In particular a parallel manipulator with six degrees of freedom can thus be realised, pertaining to the category known under the name "Stewart platform". Each pair of articulated kinematic units oriented in accordance with the same axis accompany a translation of the movable platform and of the object fixed on it when the two units effect translations of the same amplitude, and a rotation of the platform when these units effect unequal translations.

In the case in which such an apparatus is used in a passive manner to measure positions and movements imposed on an object fixed on the movable platform, it is not necessary to incorporate actuators in the articulated kinematic units, to the extend that it is sufficient to measure the translations created by the movements of the platform in each of these units, the number of the values measured simultaneously being equal to the number of degrees of freedom of the platform.

Manipulators of the parallel type are characterized by several kinematic links disposed in parallel to connect the fixed base to the movable platform. However, in some of these apparatuses, one or more of the kinematic links can be formed by two articulated devices coupled in series in order to ensure two degrees of freedom at this link. One such apparatus is described in particular in patent application EP 1 113 191 which is incorporated here by reference and in which there are described certain structural features of parallelograms with elastic joints which can be used in the present invention. The movement transmission device described in this application can be used in a positioning or measuring apparatus and can provide up to three degrees of freedom in translation of the platform, thanks to three parallel kinematic units, each comprising two parallelograms in series. Such kinematic links suffer from problems pertaining to series arrangements, in particular the fact that the first parallelogram articulated to the base has to support and displace the whole mass of the second and that the amplitude of movement permitted by such a connection in series is necessary limited.

On the contrary, an apparatus according to the invention is of an entirely parallel type, such that the actuation or the measurement of position or force in each articulated link between the base and the platform is effected with a single degree of freedom.

Patent application EP 0 937 961 describes such a positioning apparatus with six degree of freedom of entirely parallel type. The movable platform is connected to three pairs of articulated arms, each pair of arms being parallel to one of the three perpendicular axes of an orthogonal Cartesian reference system. The two arms of each pair are fixed for the other part to a plate mounted on a spherical joint and associated with two micrometer screws, allowing this plate to be pivoted about two axes of rotation perpendicular to one another, in order to impose a translation and/or a rotation on the platform. Each arm comprises two joints formed by a longitudinal wire, thus allow deflection according to two axes, and also torsion if applicable.

However, this known construction suffers however from problems with the very delicate joints which only allow small loads on the movable platform. To provide good rigidity in compression the wire of the joint has to have a large enough cross-section, but to allow a sufficient angle, it has to be relatively long, which increases the risk of buckling. In consequence the joints of this type have a reduced angular range in practice. Another problem resides in the complexity of the measurements, since the two micrometers acting on each intermediate plate interact with each other.

The object of the present invention is to provide a positioning or measuring apparatus with four, five or six degrees of freedom having a simple and robust construction, allowing a large amplitude of movement of the movable platform and a very high precision in determining or measuring positions, displacements or forces along each degree of freedom.

An additional object consists in providing the apparatus with a particularly rigid frame which is easy enough to fabricate.

Another additional object aims to arrange the apparatus in the form of a combination of like modules, in order to simplify its manufacture and its maintenance and reduce the corresponding costs.

Another additional object again consists in arranging the apparatus is such a manner that the object mounted on the platform will be easily accessible at the periphery of the apparatus, in particular to make it possible to position it relative to another object outside the apparatus.

To this end, the invention concerns an apparatus of the kind specified in the preamble, characterized in that each of the articulated kinematic units comprises a parallelogram which is elastically deformable in its own plane, an articulated transmission device connecting the parallelogram to the platform, and a linear displacement sensor providing an output signal to the measuring means, the parallelogram comprising a support element connected to the base, a translation element connected to the transmission device and two parallel arms connected to the translation element and to the support element by joints without play, in particular elastic joints.

Thus each kinematic unit comprises an articulated mechanism without play of which the parallelogram can have a course practically the same as that of the platform in the direction of translation in question and be directly associated with the displacement sensor, which ensures very great precision of control or of measurement of positions and displacement, as well as high dynamics when this unit is provided with an actuator or a device for measuring force. In particular the mechanism allows a high speed of displacement of the platform and does not exhibit any mechanical hysteresis.

Furthermore the articulated mechanism can be configured entirely within a planar form, thus being of small bulk and relatively easy to manufacture. The parallelogram configuration allows this to be disposed round certain elements, such as an electromagnetic transducer and/or a displacement sensor, while the parallelogram can have a large enough size to allow a highly linear course with limited angular deviations of the joints. This also reduces the displacements of second order, perpendicular to the direction of translation, which are caused by variations in the height of the parallelogram.

Thanks to the use of elastic joints, the articulated mechanism is not only without play but also without friction and wear. There is thus no need for lubrication and it is not sensitive to the presence of dust or liquids or other dirt, which allows it to be used in a dirty environment. Conversely, since the mechanism does not release particles or other contaminating elements, it can be used advantageously in a clean room or similar environment.

Other features and advantages of the present invention will appear better from the description which follows of various embodiments of the invention, given by way of non-limiting example with reference to the accompanying drawings, in which:

FIGS. 6 to 8 are views similar to FIGS. 1 to 3, in which the electromagnetic actuators have been omitted to allow the other elements of the apparatus to be seen better;

FIG. 9 is a diagram of a plane articulated structure forming a structural module of the apparatus shown in FIGS. 1 to 8, FIGS. 10 to 15 show different types of elastic joints which can be used in an apparatus according to the invention;

Figure 1:
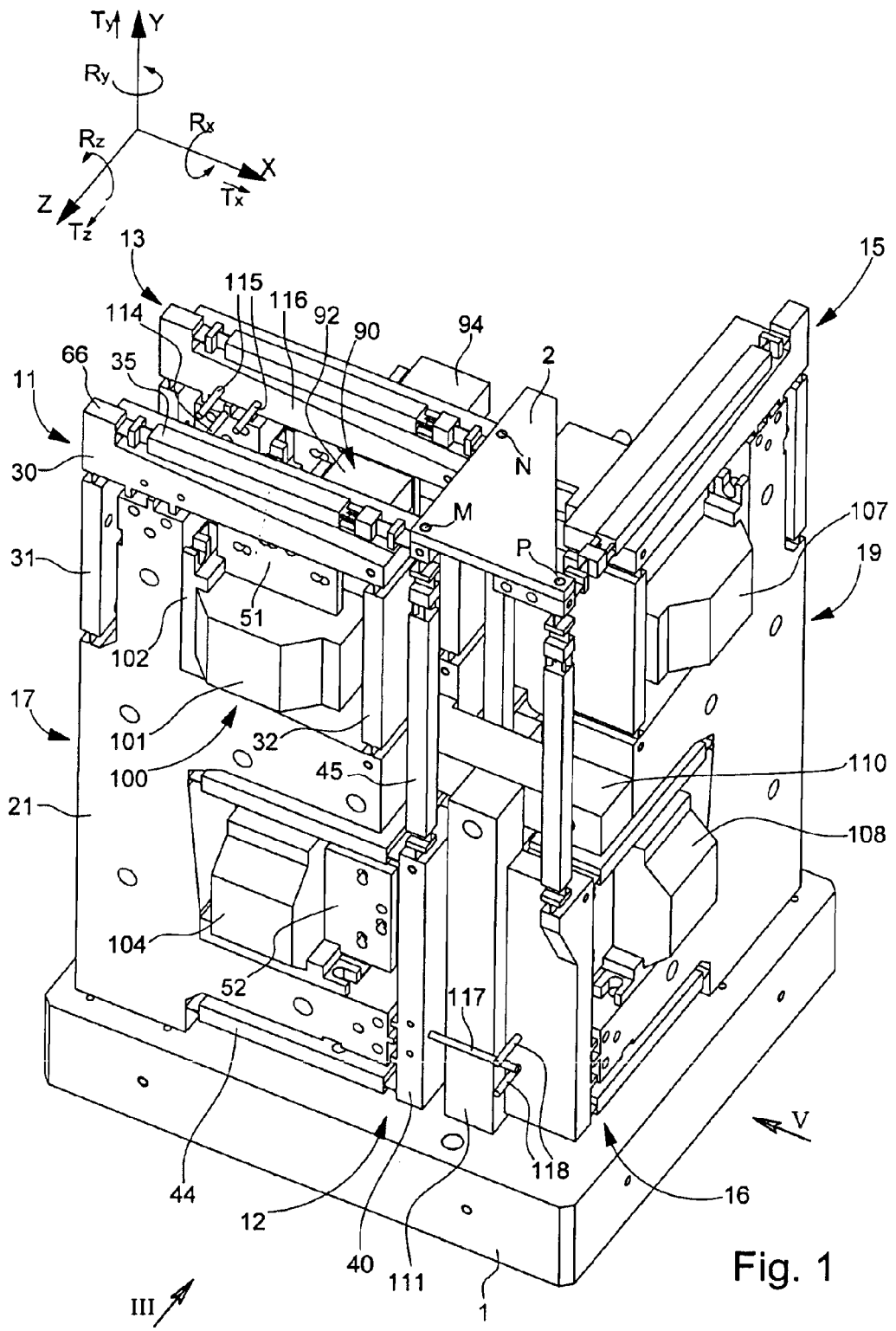
FIG. 1 is a front view in perspective showing the principal elements of a first preferred embodiment of the invention, in the form of a positioning apparatus forming a high precision manipulator with six degrees of freedom, the external protecting walls being removed to allow its internal structure to be seen.

The apparatus shown in FIGS. 1 to 8 comprises a fixed base 1 and a movable platform 2 adapted to support an object 3 (FIG. 2), for example the end of an optical fibre which has to be positioned with high precision. Platform 2 is connected to base 1 by six articulated links disposed in parallel, formed by six articulated kinematic units 11, 12, 13, 14, 15 and 16, each having a direction of translation parallel to one of the three axes X, Y and Z of an orthogonal Cartesian reference system. More specifically, the three kinematic units 12, 14 and 16 have a direction of translation parallel to axis Y, which is preferably vertical in the present case, the two kinematic units 11 and 13 have a direction of translation parallel to axis X, while the sixth kinematic unit 15 had a direction of translation parallel to axis Z. The significance of having three of these units oriented according to the vertical direction will be seen below.

In this example, the abovementioned six kinematic units are grouped two by two in three planar articulated structures 17, 18 and 19, which can advantageously form structural modules, since they all have the same geometrical configuration and identical construction, at least insofar as their principal elements are concerned. In the present example, these three structures extend in vertical planes, such that they can provide high rigidity in relation to the effects of gravity. The two articulated structures 17 and 18 are juxtaposed parallel to one another and extend in planes parallel to that defined by the axes X and Y. The third articulated structure 19 is perpendicular to the other two and extends in a plane parallel to the axes Y and Z.

FIGS. 8 and 9 respectively show the formation and the kinematic configuration of the planar articulated structure 17, which comprises kinematic units 11 and 12. This structure is called plane because the longitudinal axes of its articulated elements are located in principle in the same plane, at least in a datum position, but it will be seen below that some of them can undergo slight lateral deviations relative to this plane in dependence on movements imposed on platform 2.

Articulated structure 17 comprises a frame 21 fixed rigidly to base 1 and preferably formed by a thick plate which is cut out in such a way as to form several arms 22, 23 and 24, leaving free spaces 25 and 26 between them. Kinematic unit 11 comprises a translation element 30 and two identical and parallel arms 31 and 32, of which one end is connected to frame 21 by an elastic joint 33 and the other end is connected to the translation element by an elastic joint 34. The four joints 33 and 34 are of the type with a single degree of freedom, which is represented by an open circle in FIG. 9. The axis of rotation of these joints is perpendicular to the plane of the drawing, i.e. the general plane of structure 17. Thus elements 30 to 32 form together with frame 21 an elastically deformable parallelogram which allows translation element 30 to perform a movement in translation Tx parallel to axis X. Obviously element 30 also undergoes vertical displacements but these are of the second order and remain minimal so long as arms 31 and 32 are near to the vertical.

Translation element 30 is connected to platform 2 by means of an articulated transmission arm 35 which is substantially horizontal and comprises a joint 36 near to its connection to translation element 30 and a joint 37 near to its connection to movable platform 2. Joint 36 has two degrees of freedom, in other words is of Cardan type, to allow transmission arm 35 to follow the movements of platform 2 in directions Y and Z without transmitting an appreciable force to translation element 30 in these two directions. This type of joint is represented by a cross in a circle in FIG. 9. Joint 37 is of a type with three degrees of freedom, otherwise called spherical, represented by a solid disc in FIG. 9, so that the rotations of platform 2 about the three axes X, Y and Z are not transmitted to the transmission arm 35. On the other hand the two joints 36 and 37 are rigid and without play in the axial direction X of the transmission arm 35, so that arm 35 transmits any translation Tx of element 30 strictly to movable platform 2 and vice versa.

In order to prevent an excessive amplitude of translation Tx, frame 21 comprises a projecting stop 38 which extend in a space between two lugs 39 (or two analogous shoulders) of translation element 30, in such a way as to limit the maximum translation of the latter in the two senses from the illustrated middle position. The width of this space depends mainly on the length of arms 31 and 32 and is typically selected in such a way as to limit the inclination of the these arms to around 5 degrees, which nevertheless permits an amplitude of translation of several millimetres. On the other hand it is noted that the relatively large spacing of arms 31 and 32 ensures good rigidity of the parallelogram.

Second articulated kinematic unit 12 of structure 17 is realised according to the same principles and comprises a translation element 40 disposed vertically, which forms with frame 21 and two articulated parallel arms 41 and 42 provided with joints 43 and 44 a deformable parallelogram, allowing the translation element to effect a movement in translation Ty in the direction of axis Y, i.e. in the vertical direction. Translation element 40 is connected to platform 2 by a transmission arm 45 provided with joints 46 and 47 near to its ends. Joints 43, 44, 46 and 47 are identical to joints 33, 34, 36 and 37 described above.

As in kinematic unit 11, the amplitude of the translation Ty of translation element 40 is limited by a stop 48 integral with frame 21, positioned between two lugs 49 of element 40.

The two transmission arms 35 and 45 preferably terminate in a common block 50 which is fixed in removable manner to platform 2.

It is also noted that translation elements 30 and 40 have plates 51 and 52 respectively, which extend into free spaces 25 and 26 to allow connection of respective actuating elements and sensors housed in these spaces, as will be seen below.

Articulated structure 17 described above can advantageously be realised in one piece from a metal plate, by electro-discharge machining. In order to increase the excursions allowed by the joints while preserving a reduced size, the preferred metal is titanium. The use of the electro-discharge machining technique allows precise and rapid fabrication of such a part, at an acceptable cost.

To the extent that such an articulated structure extends in a vertical plane in the position of operation of the apparatus, the plate serving for its realisation does not need to have a great thickness in order to exhibit sufficient rigidity relative to the effects of gravity, since it is easy to give adequate dimensions in the plane of the plate to the parts concerned of this structure, in particular to its frame 21.

Figure 10:
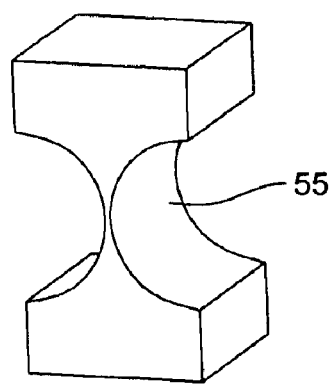
Figure 11:
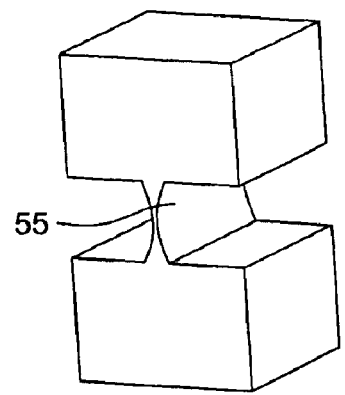
Figure 12:
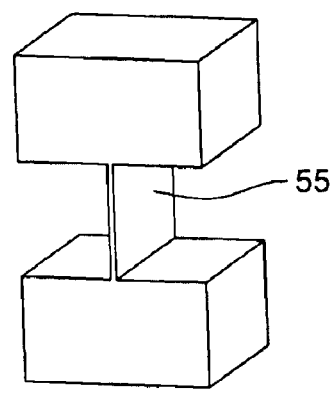

FIGS. 10 to 12 show three known forms of elastic joints with a single degree of freedom, which can be used to form joints 33, 34, 43 and 44 described above. These three embodiments comprise a part of reduced thickness forming a flexible tongue 55 which allows relative rotation of the adjacent part about a transverse axis located in its plane, more or less without imposing any resistance, while only allowing relatively slight rotations about the other two perpendicular axes. At the same time this part of reduced thickness is sufficiently rigid in compression to transfer the longitudinal movements without risk of buckling. The techniques of electro-discharge machining enable these joints to be realised with high precision.

Figure 13:
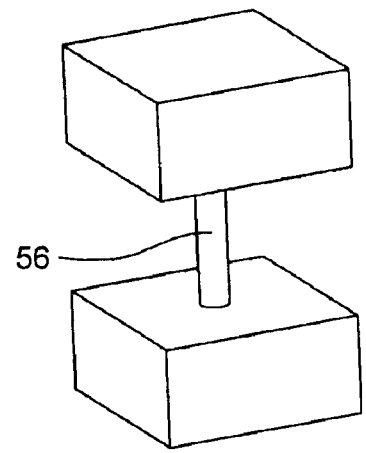

A succession of two joints of this type, disposed in such a fashion that their respective axes make an angle of 90 degrees, forms in known manner a joint of Cardan type and can be used to form joints 36 and 46 described above. Alternatively, a joint of the type shown in FIG. 13 can be used, comprising a thin part in the form of a rod 56 which is laterally flexible in any direction but sufficiently rigid in compression.

Figure 14:
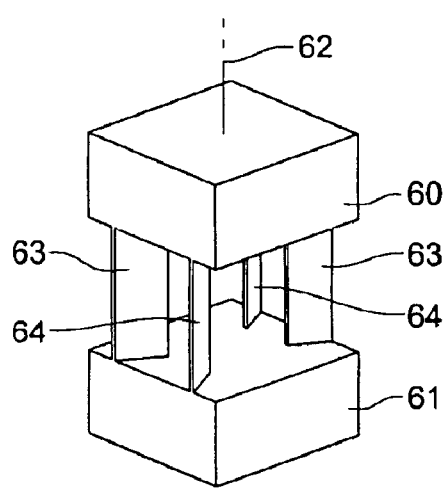
Figure 15:
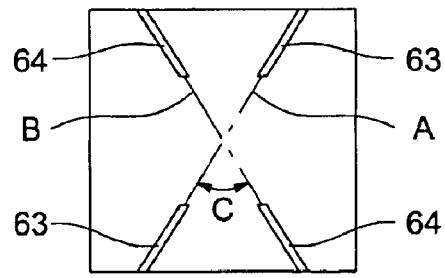

FIG. 14 shows an advantageous embodiment of a torsion joint, of which FIG. 15 shows a section at mid height. As above, this joint is formed by thinning a metal bar, in order to allow relative movement of adjacent parts 60 and 61 of this bar. In this case a pure movement in torsion is involved, namely a rotation about longitudinal axis 62 of the bar, without rotation about the two axes perpendicular to this and without transverse displacement between parts 60 and 61. The thinned part is formed by two pairs of flexible tongues 63 and 64 parallel to axis 62, the two tongues 63 being situated in the same plane A and the other two tongues 64 being situated in the same plane B, which forms an angle C with the plane A sufficiently large for tongues 64 to be relatively far from the plane A and tongues 63 relatively far from the plane B. This arrangement prevents any movement of deflection or shearing between parts 61 and 62 of the bar, thanks to the rigidity of tongues 63 and 64 in their own plane.

Compared with torsion joints of known type using a thin part in the form of a wire, the joint shown in FIGS. 14 and 15 has the advantage of being much more rigid in compression and of preventing any transverse displacement by shearing. Moreover, since it is empty in its central region, it can advantageously be fabricated by a technique of wire electro-discharge machining, which is less costly than electro-erosion into a cavity. The angle C shown in FIG. 15 has a value less than 90 degrees in order to facilitate the electro-discharge machining by wire with current machines.

In its most general form, a torsion joint realised according to the principles used in the joint of FIGS. 14 and 15 has to comprise at least two flexible tongues disposed in respective planes parallel to the desired torsion axis, with the condition that at least two of these planes of the tongues are not parallel to one another. For example, the disposition of the tongues can have the form of an H, a U, a V, a star, etc., in a section perpendicular to the torsion axis. The tongues can be contiguous or not, depending on the desired rigidity.

Joints 37 and 47 with three degrees of freedom described above are preferably formed by joining together a torsion joint according to FIG. 14 with a pair of deflection joints disposed perpendicular to one another, as in joints 36 and 46.

Figure 16:
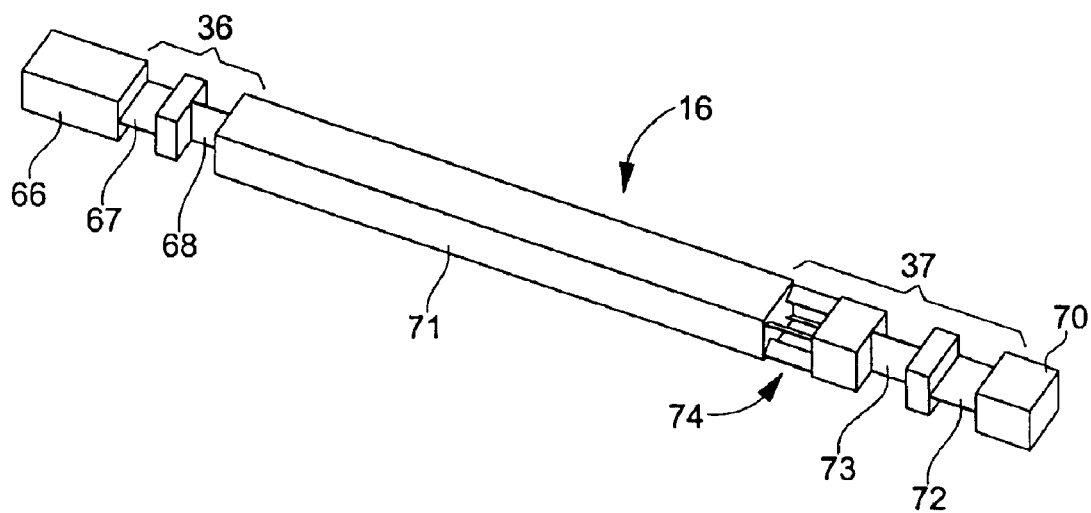
FIG. 16 shows a transmission arm in perspective, which can be used in an apparatus according to the invention.

FIG. 16 shows in more detail transmission arm 35 represented in particular in FIGS. 8 and 9, showing in particular how joints 36 and 37 with several degrees of freedom of this arm are each formed by a combination of several joints with a single degree of freedom. Transmission arm 35 is formed by a metal bar, for example with a square cross-section, provided with five distinct elastic joints, each having a single degree of freedom. Joint 36 with two degrees of freedom described above, located near to a first end 66 of the bar, comprises two deflection joints 67 and 68, which are preferably substantially perpendicular to one another, joint 67 allowing deflection of the bar about an horizontal axis and joint 68 allowing deflection about a vertical axis. Each of these joints can be one of the types illustrated in FIGS. 10 to 12.

Joint 37 with three degrees of freedom is located near to the other end 70 of the bar and is separated from joint 36 by a relatively long central part 71 of the bar. It comprises two deflection joints 72 and 73, preferably substantially perpendicular to one another and like joints 67 and 68, and a torsion joint 74 which is preferably of the type shown in FIGS. 14 and 15. However, it is noted that torsion joint 74 does not have to be close to deflection joints 67, 68, 72 and 73, i.e. it could occupy any position whatsoever along arm 35. On the other hand, it should be noted that some transmission or connecting arms in the apparatus according to the invention do not need to have a degree of freedom in torsion and can thus omit a torsion joint.

Figure 17:
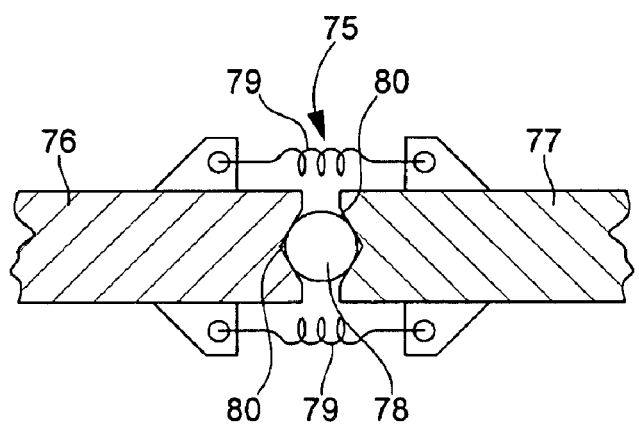
FIG. 17 is a schematic sectional view showing another type of joint which can be used in an apparatus according to the invention.

Although the use of elastic joints is preferred in the framework of the invention, it is possible to use other types of joints without play. For example, FIG. 17 shows a schematic longitudinal section of a ball joint 75, thus with three degrees of freedom, which can form joints 37 and 47 in the diagram of FIG. 9 for example. Joint 75 connects two bars 76 and 77 and has to transmit an axial force in compression from one to the other. A ball 78 is compressed axially between the two ends of the bars opposed to each other, by reason of elastic means such as springs 79 connecting them together. In order to remain centred, ball 78 seats in a central cavity 80, for example conical, formed in the end of each bar.

If movable platform 2 or an object which is lying on it is subjected to a shock or too large a force, the compressive forces which are transmitted through the elastic joints can damage the joints. To prevent this risk it is possible to provide a kind of mechanical breaker associated with each transmission arm connecting the platform to the transmission elements, since the latter are provided with abutment members.

Figure 18:
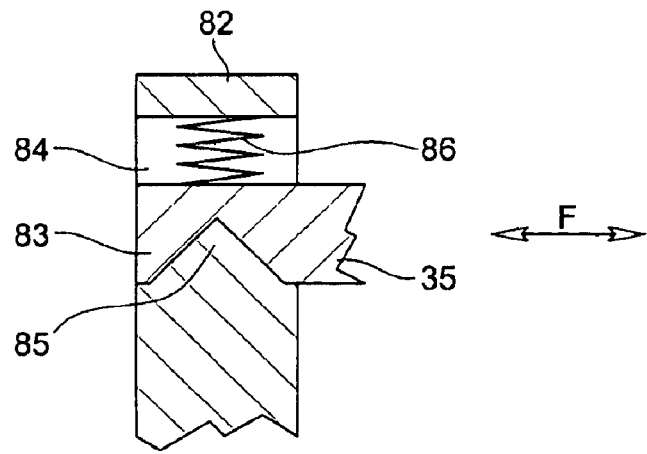
FIG. 18 is a schematic sectional view showing one way of attachment which avoids damage in the case of a mechanical overload in the apparatus.

FIG. 18 shows one possible embodiment of such mechanical breaker in the region of the connection between head 82 of translation element 30 and corresponding end 83 of articulated transmission arm 35. A rectangular hole 84 passes through head 82 in the longitudinal direction of arm 35. The lower wall of this hole has a projecting part 85 in the form of a wedge which engages in a notch of corresponding shape formed in the arm 35. This is kept in elastic engagement with projecting part 85 by the vertical bias of a spring 86 mounted in hole 84. Thus the movement in translation Tx of element 30 is transmitted to the transmission arm or vice versa, without any play, so long as the transmitted force F between these elements does not exceed a limit force which causes relative sliding between these two parts on the corresponding inclined face of projecting part 85, overcoming the bias provided by spring 86.

As is seen in particular in FIG. 1, articulated kinematic unit 11 is associated with a linear displacement optical sensor 90 serving to measure the movements in translation of translation element 30 in X direction. This sensor comprises an optical scale 91 (FIG. 2) fixed to element 30' and a housing 92 mounted on frame 21 of articulated structure 17. Optical sensor 90 can advantageously be of the type LIP 481 R 2 $\mu$m±0.2 $\mu$m G0 with IBV 660 B interpolator of the company Heidenhain of Schwerzenbach, Switzerland, which forms a linear incremental measurement system of very high precision having a measurement stroke of 10 mm.

All other articulated kinematic units 12 to 16 of the apparatus are equipped with like optical sensors, given references 93 to 97 in FIGS. 1 to 5. The output signals of these sensors are transmitted to a central unit for measurement and control of the apparatus, not shown.

Articulated kinematic unit 11 is associated with a linear electric motor 100 which is controlled by the abovementioned central unit in order to impose desired positions and displacements on translation element 30 and on platform 2, in a direction parallel to axis X. This motor comprises a stator winding 101 carried by a support 102 fixed to frame 21, while the moving part of the motor is formed by a magnet fixed on plate 51 integral with translation element 30. Motor 100 is preferably of the type MMA made by ETEL in Motiers, Switzerland.

All other articulated kinematic units 12 to 16 are equipped with linear motors like motor 100, having references 104 to 108 in FIGS. 1 to 5.

Each of linear motors 100 and 104 to 108 is controlled by a control loop comprising the corresponding optical sensor, in order to impose and maintain a position of a corresponding point of connection M, N or P of platform 2 with a very high precision, which is of the order of 1 $\mu$m to 0.1 $\mu$m, even up to 5 nm, depending on the resolution of the sensor which is employed. Such a precision is possible in particular because of the fact that the linear motors and the displacement sensors which are used are of types without contact and that the joints of the kinematic units are without play and without friction. The rigidity of articulated structures 17, 18 and 19 also plays a role in this result. On this subject it is noted that the three frames of these articulated structures are made solid with one another by intercalated elements such as 110 and 111, in order to form with base 1 a very rigid frame of the apparatus.

Figure 2:
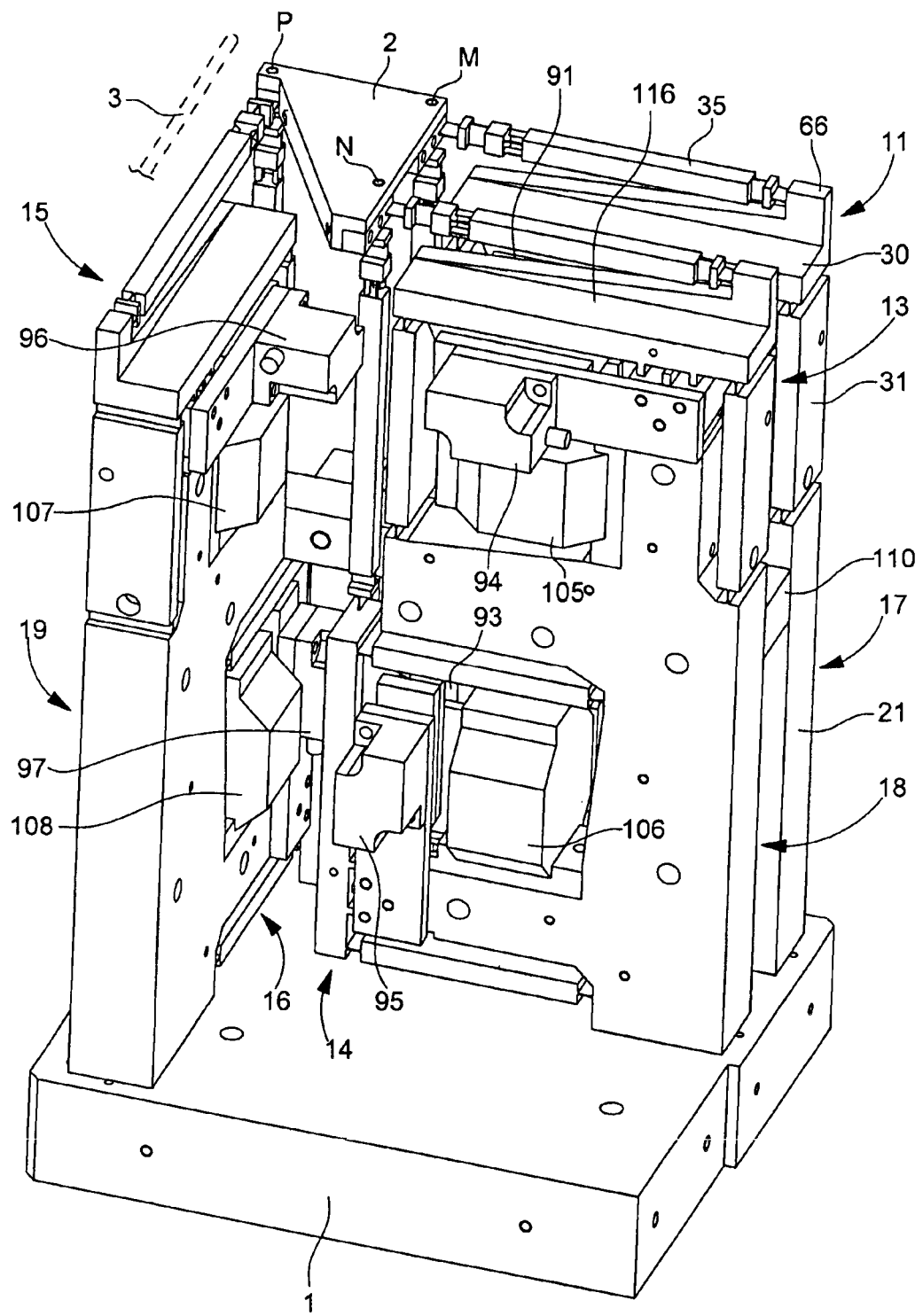
FIG. 2 is a perspective view of the rear of the apparatus of FIG. 1.
Figure 3:
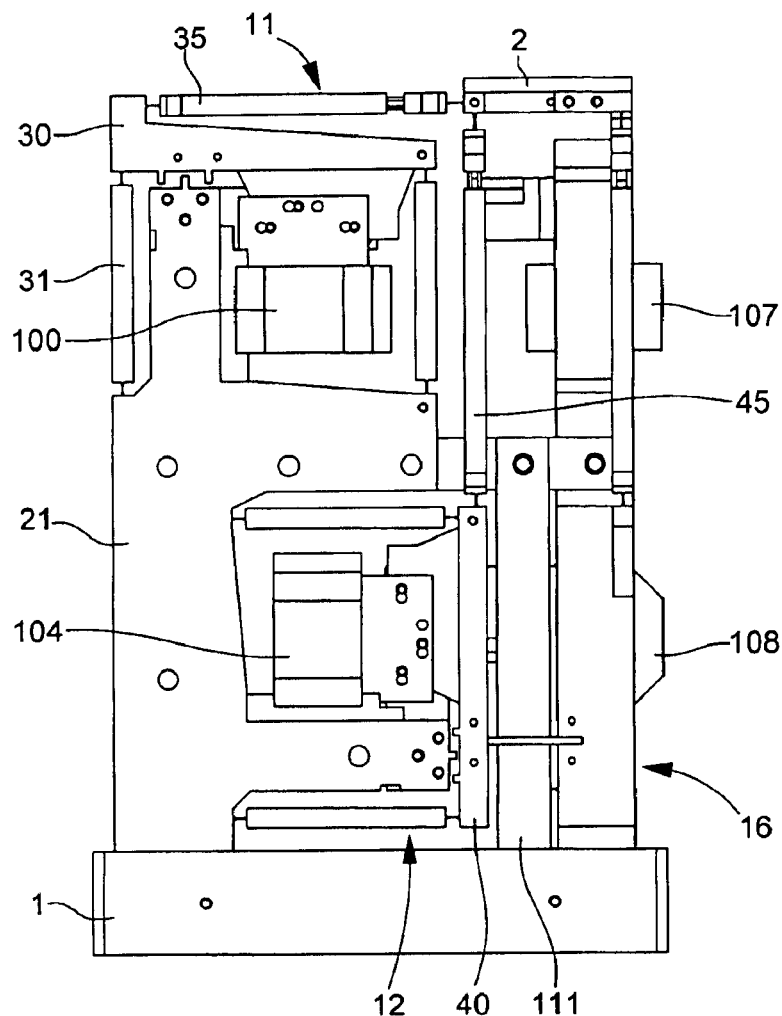
FIG. 3 is a front elevation according to arrow III in FIG. 1.
Figure 4:
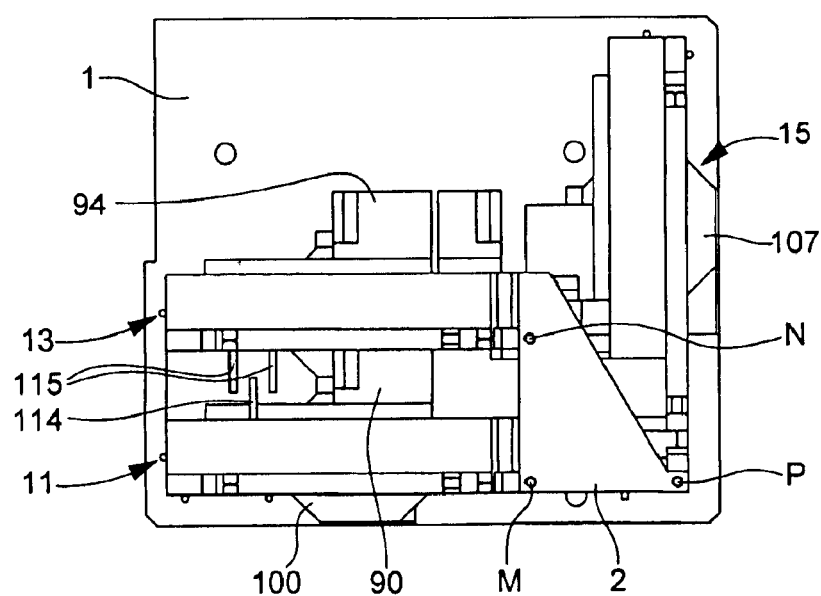
FIG. 4 is view from above of the apparatus of FIG. 1.
Figure 5:
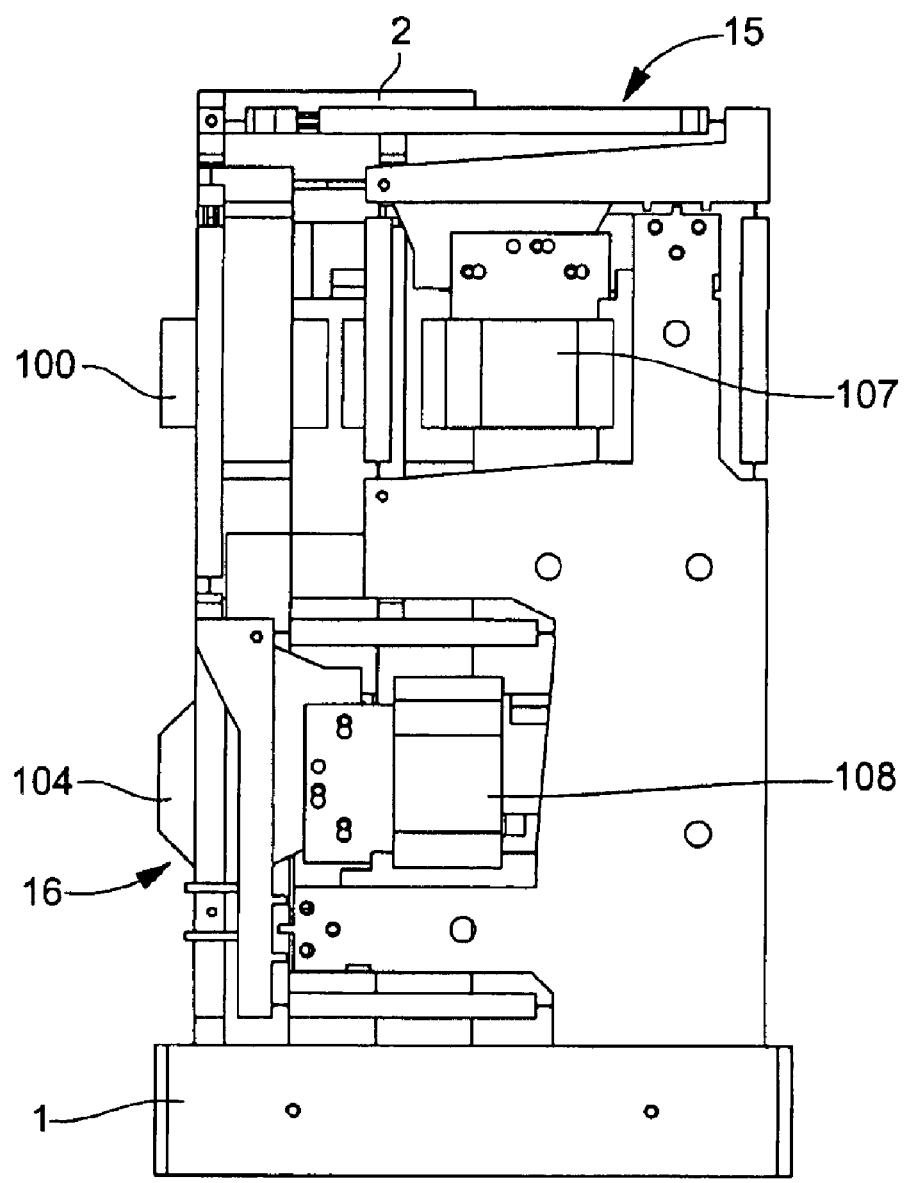
FIG. 5 is a side elevation according to arrow V in FIG. 1.
Figure 6:
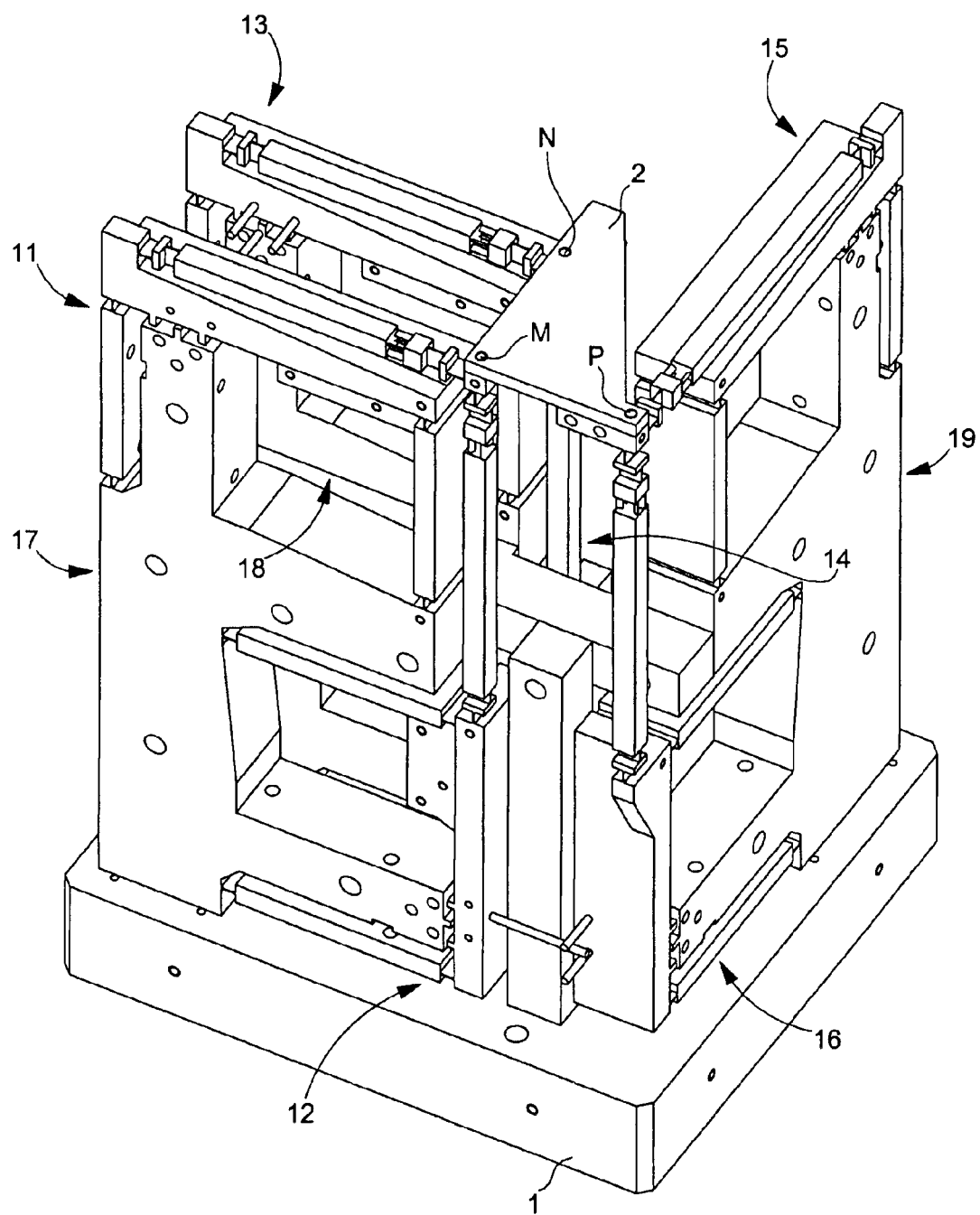
Figure 7:
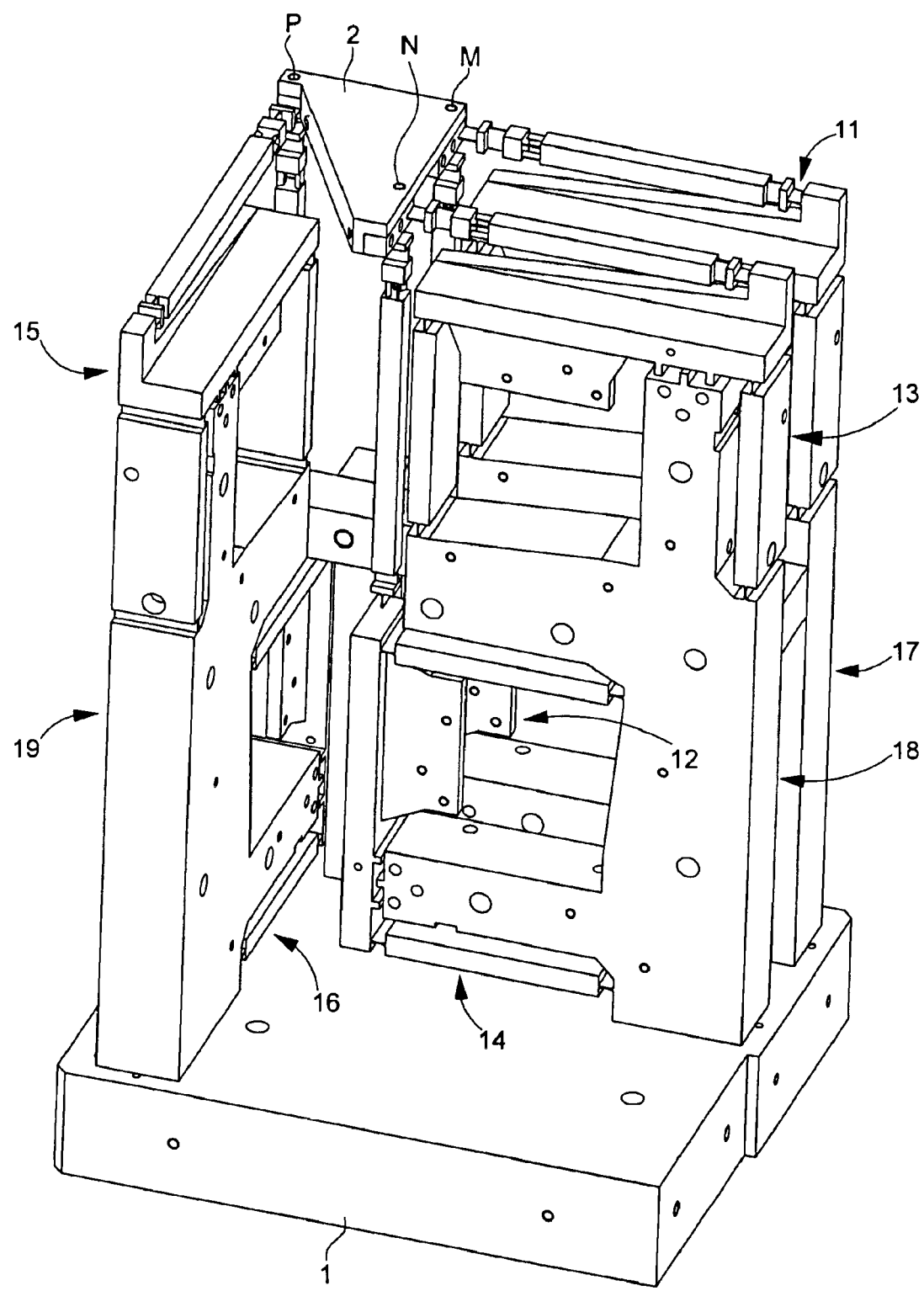

In FIGS. 1 and 2 it is noted that the two kinematic units 11 and 12 of articulated structure 17 are connected to the same connection point M of the platform 2, which simplifies the control. In similar manner, the two kinematic units of articulated structure 18 are connected to the same connection point M and those of articulated structure 19 to the same connection point P. The three points M, N and P form the apices of a right-angled triangle, such that point P is located at the intersection of the respective vertical planes of articulated structures 17 and 19. Since these are disposed along two side faces of the apparatus, point P is located near to an upper corner of the apparatus. This location is ideal for object 3 which the apparatus is to manipulate, since it is easy to bring another object or apparatus relative to which object 3 is to be positioned or manipulated close to this location.

It is also noted that the three axes of translation of kinematic units 11, 15 and 16 which are parallel to axes X, Z and Y respectively intersect in the region of connection point P. As a result a translation imposed by one of these units produces a practically equal translation of point P, i.e. there is good decoupling between the three directions of translation at this place.

When equal translations, i.e. of the same amplitude and the same sense, are produced by the two parallel kinematic units 11 and 13 at points M and N, platform 2 undergoes a pure translation Tx principally in the direction of axis X. On the contrary, if the said amplitudes are not equal, the platform also undergoes a rotation Ry about axis Y. This rotation takes place about point P whose horizontal position in direction Z is maintained by kinematic unit 15. During this time, the levels of the three points M, N and P are maintained by the three vertical kinematic units 12, 14 and 16.

Actuating solely kinematic unit 15 produces a translation Tz of point P principally in Z direction. Platform 2 is then displaced practically without pivoting, since it forms an articulated parallelogram on the frame with the transmission arms of kinematic units 11 and 13.

In similar manner, the combined movements of the three vertical kinematic units 12, 14 and 16 makes it possible to impose vertical translations Ty on platform 2, parallel to axis Y, if their amplitudes of translation are equal, and rotations Rx and Rz about axes X and Z if said amplitudes are not equal.

Having three kinematic units with vertical axes to support platform 2 has the advantage of distributing the weight of the platform and of the elements which it supports over these three units (instead of two in the case of patent application EP 0 937 961). Specifically, this weight is transferred to the frame through the linear electric motors 104, 106 and 108, which can thus be less powerful than would be the case for a number of only two.

As is seen in FIG. 1, projecting abutments 114 and 115 are disposed on translation elements 30 and 116 respectively of parallel kinematic units 11 and 13, in order to cooperate to form a stop arrangement adapted to limit the differential translation between these two translation elements, in order to limit rotation Ry of the platform. Similar stops 117 and 118 are provided on kinematic units 12 and 16 in order to limit rotations Rz and on kinematic units 17 and 18 in order to limit rotations Rx. In the present example the maximum value of these rotations which is permitted is of the order of ±5 degrees relative to the middle position.

It is noted that the apparatus described above is capable of imposing forces on platform 2 and object 3 fixed thereon in six degrees of freedom, namely linear forces along axes X, Y and Z and torques corresponding to rotations Rx, Ry and Rz. To this end, linear motors 100 and 104 to 108 are controlled with predetermined currents, which are not slaved to the output signals of optical sensors 90 and 93 to 97.

The preceding description shows that the principles of the present invention allow a high precision manipulator with six degrees of freedom to be realised, with a modular construction, which is very compact and very rigid and which further has the advantage of supporting the manipulated object very close to an external corner of the apparatus. Although the three directions of translation X, Y and Z are preferably perpendicular to one another, the same principles of construction can be used with non-perpendicular directions of translation.

A person skilled in the art will understand that the apparatus described above can be used to measure the position of object 3 which it supports, by means of optical sensors 90 and 93 to 97, if electric motors 100 and 104 to 108 are turned off or removed. In this case platform 2 is not supported by the apparatus itself but by the external device which imposes a position on object 3.

By replacing linear motors 100 and 104 to 108 by force sensors, especially contact-free sensors formed by electromagnetic transducers, or by using the linear motors as such transducers, it is possible to transform the manipulator described above into a force sensor with six degrees of freedom, enabling forces applied to platform 2 in the form of forces parallel to axes X, Y and Z and torques about these axes to be measured.

Figure 19:
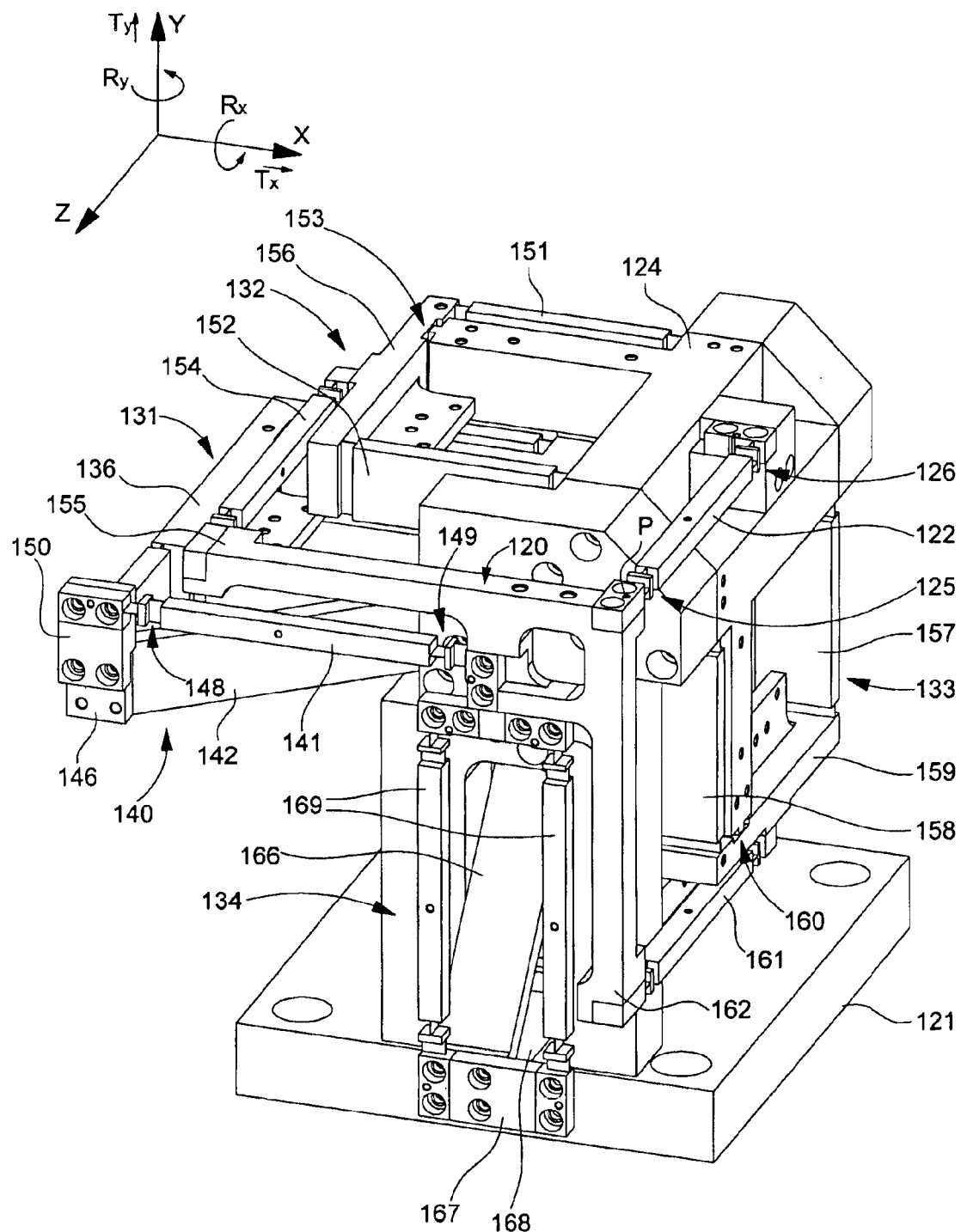
FIG. 19 is front view in perspective showing the principal elements of a second embodiment of the invention, in the form of a high precision manipulator with four degrees of freedom.
Figure 20:
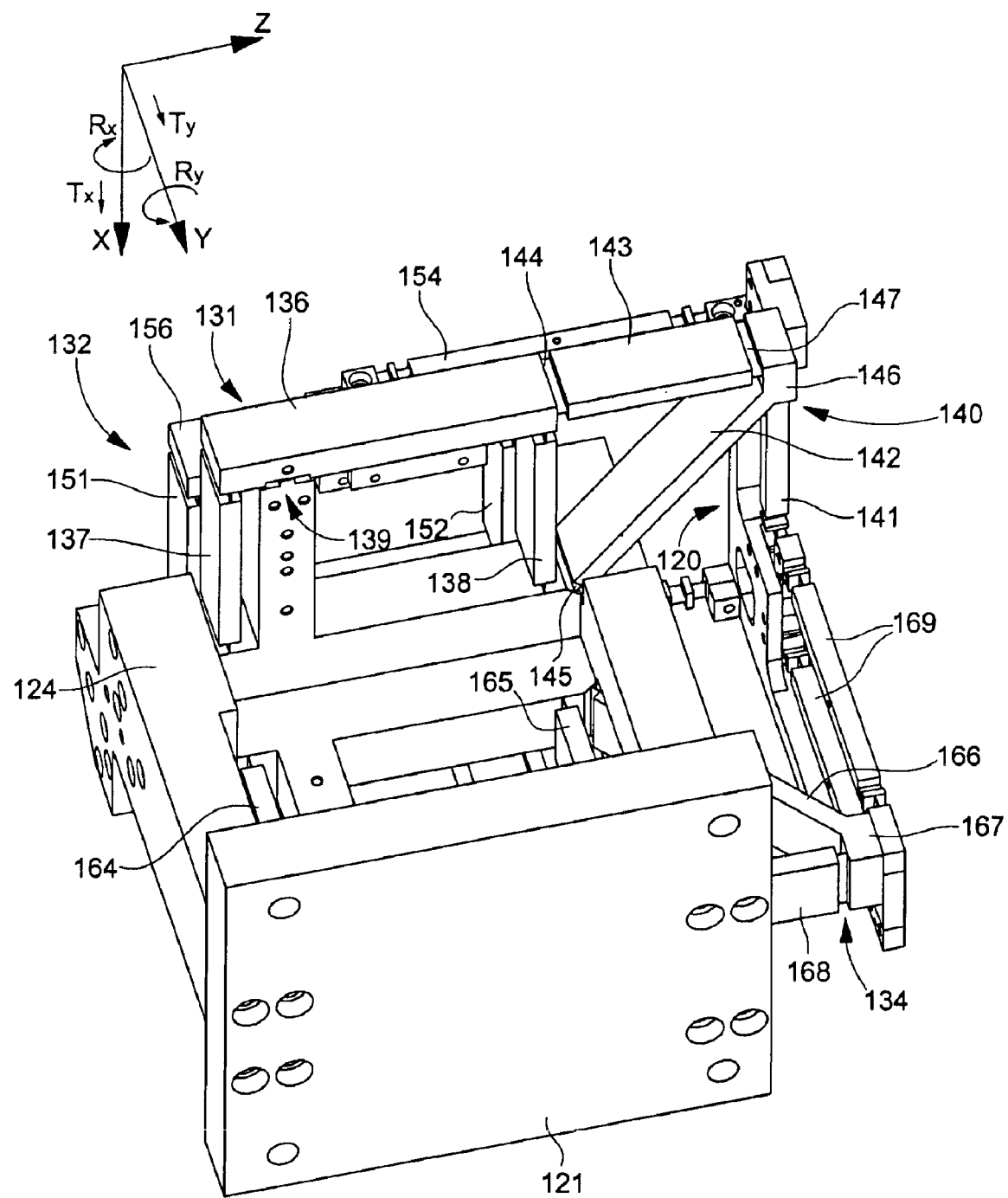
FIG. 20 shows the apparatus of FIG. 19 seen from the opposite side.

With reference to FIGS. 19 and 20, a second embodiment of the invention will be described in more summary manner, in the form of a manipulator with four degrees of freedom, namely translations Tx and Ty parallel to axes X and Y and rotations Rx and Ry about these same axes. As many of the elements of this apparatus are like those of the preceding example, the elements which differ therefrom will principally be described.

A platform 120 of the apparatus has a shape substantially of a try-square and it supports the object to be manipulated near to a point P close to the corner of the square. Platform 120 is connected to a base 121 of the apparatus by six articulated links disposed in parallel, comprising an articulated connecting arm 122 parallel to axis Z and four articulated kinematic units, of which one forms two connections between the platform and the base. These articulated kinematic units 131 to 134 are associated with optical displacement sensors and linear electric motors as in the preceding example, but the sensors and motors are not shown in the drawings for reasons of clarity.

One end of arm 122 is fixed to platform 130 in the vicinity of point P. Its other end is fixed to a frame 124 mounted on base 121. Two elastic joints 125 and 126 with two degrees of freedom are provided near the ends of arm 122. This arm thus prevents any translation of point P in the direction of axis Z but allows translations and rotations relative to axes X and Y. There is no need for a torsion joint because platform 120 cannot turn about axis Z.

Kinematic unit 131 comprises a translation element 136 and two identical and parallel arms 137 and 138, whose ends are connected to frame 124 and to element 136 by elastic deflection joints to form a deformable parallelogram as in the preceding example. Element 136 can move in translation in a direction parallel to axis Z, the translation being limited by a system of stops 139. Platform 120 is connected to translation element 136 by an articulated transmission device 140 comprising an articulated transmission arm 141, a direction changing arm 142 and an intermediate arm 143, which extends in prolongation of translation element 136, to which it is connected by an elastic joint 144 with a single degree of freedom. Arm 141 is substantially parallel to axis X while arm 143 is substantially parallel to axis Z, such that they form an angle between them which oscillates about 90 degrees in the course of the movement of the mechanism. Direction changing arm 142 is located substantially on a bisector of this angle. Its rear end is connected to frame 124 by an elastic deflection joint 145. At its other end it has a head 146 which is connected to arm 143 by an elastic joint 147 analogous to joint 144. Transmission arm 141 has two deflection joints 148 and 149 with two degrees of freedom near to its ends. One of its ends is fixed directly to platform 120 while the other is fixed to head 146 of direction changing arm 142 with the aid of an intermediate part 150 which allows arm 141 to be offset relative to the general plane of kinematic unit 131. Such an offset and more generally the use of direction changing device 140 can be useful in giving more choice in the incorporation of the kinematic units, in particular in respect of locating their electric motors in the regions where dispersal of heat is facilitated. This also allows the motors of several kinematic units to be placed on a common printed circuit.

Articulated kinematic unit 132 extends alongside unit 131 but is has no direction changing device. It comprises an articulated parallelogram similar to that of unit 131 and comprises a translation element 156 and two parallel arms 151 and 152. Element 156 is provided with an abutment device 153 which limits its amplitude of translation. Its transmission arm 154, whose construction is like that of arm 141, extends in the same direction Z as element 156 but is offset laterally. This arm is fixed at one end 155 to platform 120, so that unit 132 imposes translations in the direction of axis Z at this end. Since point P cannot move in this direction, such a movement translates a rotation Ry of the platform relative to axis Y.

Articulated kinematic unit 133 has a configuration like that of unit 132, with two parallel arms 157 and 158, a translation element 159 provided with an abutment device 160, and an articulated transmission arm 161 which is connected to a lower end 162 of platform 120. This unit has an effect like that of unit 132 save that it produces a rotation Rx of platform 120 about axis X.

Kinematic unit 134 is similar to unit 131 in the sense that is comprises a direction changing device like device 140 described above and enabling a vertical translation along axis Y to be imposed on platform 120 from a horizontal translation along axis Z in the articulated parallelogram. This latter comprises two parallel arms 164 and 165 and a translation element which is not visible but extends above base 121. This element is connected to head 167 of a direction changing arm 166 by an articulated intermediate arm 168 similar to the arm 143. The platform 120 is connected to head 167 of the direction changing arm by means of two articulated transmission arms 169 which are parallel and spaced from one another and constructed like arm 141. Thus elements 167,169 and 120 together form a deformable parallelogram whose effect is to prevent rotation of platform 120 about axis Z. Thus the joints of the parallelogram and of the direction changing arm of kinematic unit 134 are relatively wide and thus do not allow any torsion, which prevents any rotation of head 167 of the direction changing arm about axis Z.

In summary the apparatus illustrated in FIGS. 19 and 20 enables the following movements to be imposed on point P of platform 120:

translation Tx principally along the axis X by means of kinematic unit 131;
translation Ty principally along the axis Y by means of kinematic unit 134;
rotation Rx by means of kinematic unit 133;
rotation Ry by means of kinematic unit 132.

Thanks to the two direction changing devices the direction of translation is the same in all four deformable parallelograms, i.e. the direction of axis Z. Thus the motors are grouped two by two, as are the optical sensors, which facilitates the electrical connections and cooling. Furthermore this arrangement is especially advantageous in that the type of actuator can be changed, for example by replacing the linear motors by screws and nuts and rotary electric motors, since the size of the apparatus is then only increased in a single direction.

Figure 21:
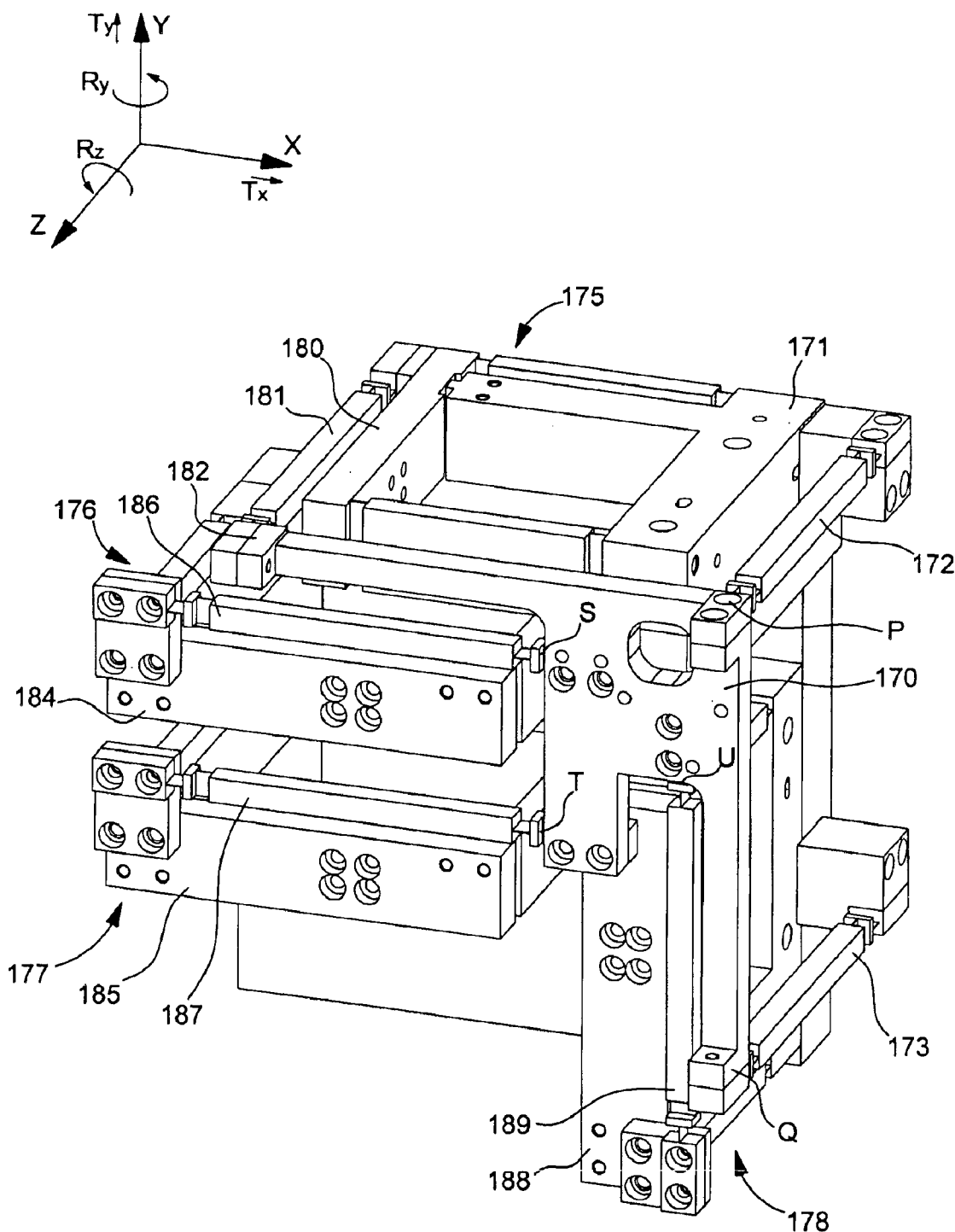
FIG. 21 is a front perspective view showing the principal elements of a third embodiment of the invention, in the form of high precision manipulator with four degrees of freedom.

FIG. 21 shows a third embodiment of the invention, in the form of a manipulator with four degrees of freedom which, in contrast with that of FIGS. 19 and 20 does not comprise a direction changing device. Movable platform 170 of this apparatus has the form of a try-square and it is connected to a frame 171 of the apparatus by means of two articulated connecting arms 172 and 173 with four degrees of freedom, like connecting arm 122 shown in FIG. 19. These two arms are parallel to the axis Z and are attached to the platform at two connection points P and Q located on the same vertical, such that these points cannot be subjected to a principal translation in the direction of axis Z. The object to be manipulated will be placed near to point P.

Moreover platform 170 is connected to frame 171 by four articulated kinematic units 175, 176,177 and 178. The structure of these units is comparable to that of the units without a direction changing device of the preceding example, namely units 132 and 133, so that not all of the elements will be described. As in the preceding example, the optical sensors and the linear motors are omitted, in order to clarify the drawing.

Translation element 180 of kinematic unit 175 is connected by an articulated transmission arm 181 to one end 182 of platform 170 in the form of a try-square. It effects a translation Tz which imposes a rotation Ry on the platform, in particular about point P.

Translation elements 184 and 185 of kinematic units 176 and 177 are parallel and effect translations parallel to axis X. These translations are transmitted to the platform by respective parallel articulated transmission arms 186 and 187 of the two kinematic units, these arms being connected to points of connection S and T spaced vertically from one another on the platform. Thus, when the two kinematic units 176 and 177 effect equal translations, they impose a translation Tx parallel to axis X on platform 170, while when their amplitudes of translation are not equal, they also impose a rotation Rz on the platform.

As to kinematic unit 178, its translation element 188 effects a vertical translation Ty and transmits this movement to the platform by means of articulated transmission arm 189 connected to connection point U of the platform. During this time, arms 186 and 187 of units 176 and 177 function as an articulated parallelogram which prevents a rotation Rz of the platform.

The drawings thus show that the construction of the apparatus is extremely compact, especially because the three kinematic units 175, 176 and 177 extend in parallel planes and are stacked alongside the main part of frame 171.

The applications of the apparatus realised according to the present invention extend to very varied fields, comprising in particular:

optical and opto-electronic alignment with the possibility of active alignment;
high precision assembly;
manipulation of bio-elements, for example in genomics and in in vitro fertilisation;
man-machine interfaces, with or without force reaction;
tele-operation, tele-manipulation;
machining, for example by removal of fragments by laser, electro-erosion, engraving;
scanning surfaces;
active compensation of vibrations;
vibrator tables;
measurement of forces;
measurements of position, for example by a feeler;
in the medical field, for example surgery, micro-surgery, tele-surgery.

What is claimed is:

1. An apparatus for imposing or measuring a position or a force with at least four degrees of freedom, comprising a fixed base, a movable platform, articulated links connecting the movable platform in parallel to the base, and measuring means, said articulated links comprising at least four articulated kinematic units, each of which is mounted on the base and connected to a point of connection of the platform to move in conjunction with a movement of said point in a direction of translation corresponding to one of principal axes (X, Y, Z) of a spatial reference system, at least one pair of said kinematic units being connected to two of said points of connection spaced from one another and being arranged to move in conjunction with translations thereof in a same direction and thus in conjunction with a rotation of the platform when the amplitudes of the translations at said two points of connection are unequal, wherein each of the articulated kinematic units comprises a parallelogram which is elastically deformable in its own plane, an articulated transmission device connecting the parallelogram to the platform, and a linear displacement sensor providing an output signal to the measuring means, the parallelogram comprising a support element connected to the base, a translation element connected to the transmission device and two parallel arms connected to the translation element and to the support element by joints without play.

2. The apparatus of claim 1, wherein each transmission device comprises a transmission arm with at least four elastic joints, comprising a pair of mutually perpendicular deflection joints near to each end of the transmission arm and optionally a torsion joint.

3. The apparatus of claim 2, wherein the transmission arm is fixed directly to the translation element of the associated parallelogram, or is made in one piece with said translation element, in at least one of the articulated kinematic units.

4. The apparatus of claim 2, wherein the transmission arm makes an angle with the translation element of the associated parallelogram in at least one of the articulated kinematic units and the transmission device further comprises a direction changing device connecting the transmission arm to the translation element and having an articulated direction changing arm located substantially on a bisector of the said angle.

5. The apparatus of claim 2, wherein the parallelogram and the transmission device of an articulated kinematic unit are made of a single piece.

6. The apparatus of claim 1, wherein in said pair of articulated kinematic units, the translation elements of said units parallel to one another comprise respective abutment devices cooperating with one another to limit differential translation between said translation elements, in order to limit the corresponding rotation of the platform.

7. The apparatus of claim 1, comprising at least one plane articulated structure including a rigid plate fixed to the base and two of the articulated kinematic units, whose axes of translation are substantially perpendicular to one another, said plate forming the support element of each of the two articulated kinematic units.

8. The apparatus of claim 7, comprising at least two of said plane articulated structures, arranged in similar fashion and located in parallel planes, such that their axes of translation are parallel two by two.

9. The apparatus of claim 7, comprising at least two of said plane articulated structures located in perpendicular planes, such that two of their axes of translation are parallel and the other two are mutually perpendicular, the two articulated structures being disposed along two side faces of the apparatus, such that their perpendicular axes of translation intersect in the vicinity of a corner of the apparatus.

10. The apparatus of claim 7, comprising three of said plane articulated structures, of which two are located in parallel planes and of which the third is located in a plane perpendicular to said parallel planes, such that the three structures have an axis of translation parallel to a same principal axis (Y), in particular the vertical axis.

11. The apparatus of claim 1 with six degrees of freedom, comprising six of said articulated kinematic units and wherein the direction of translation of three of the articulated kinematic units is parallel to a first (Y) of the principal axes, that of two other of the articulated kinematic units is parallel to a second (X) of the principal axes and that of the sixth articulated kinematic unit is parallel to the third (Z) of the principal axes.

12. The apparatus of claim 11, wherein the first principal axis (Y) is vertical.

13. The apparatus of claim 11, comprising three plane articulated structures, each including a rigid plate fixed to the base and two of the said articulated kinematic units, whereof the axes of translation are substantially perpendicular to one another, said rigid plate forming the support element of each of the two articulated kinematic units, the respective planes of said articulated structures all being parallel to the first principal axis (Y).

14. The apparatus of claim 1, wherein the translation element of each of the articulated kinematic units is associated with a linear electromagnetic transducer connected to electrical control and/or measuring means, said electromagnetic transducer effecting a transmission of force without contact between the translation element and the support element of the articulated kinematic unit.

15. The apparatus of claim 14, wherein the electromagnetic transducer is located within the articulated parallelogram with which it is associated.

16. An articulated transmission arm, in particular for an apparatus according to claim 1, said transmission arm being formed from a bar provided with elastic joints formed by reduction of the transverse section of the bar, characterized in that it comprises five distinct elastic joints, comprising a pair of deflection joints substantially perpendicular to one another near to each end of the bar and a torsion joint.

17. The transmission arm of to claim 16, wherein the torsion joint comprises at least two flexible lamellae located in respective planes parallel to a desired torsion axis, at least two of these planes not being parallel to one another.

18. The transmission arm of claim 17, wherein the torsion joint comprises two pairs of flexible lamellae spaced from a longitudinal axis of the bar, each pair of lamellae being located in a respective plane which contains said axis.

19. The transmission arm of claim 18, wherein said planes intersect at an angle less than 90 degrees.

* * * * *